United States Patent [19]

Leiber et al.

[11] Patent Number: 4,647,115
[45] Date of Patent: Mar. 3, 1987

[54] VEHICULAR ANTI-BRAKE LOCK SYSTEM AND METHOD OF CONTROLLING BRAKING PRESSURE

[75] Inventors: Heinz Leiber, Oberriexingen; Wolf-Dieter Jonner, Beilstein; Armin Czinczel, Korntal-Münchingen, all of Fed. Rep. of Germany

[73] Assignee: Robert Bosch GmbH, Stuttgart, Fed. Rep. of Germany

[21] Appl. No.: 781,956

[22] Filed: Sep. 30, 1985

[30] Foreign Application Priority Data

Sep. 29, 1984 [DE] Fed. Rep. of Germany ....... 3435870

[51] Int. Cl.⁴ .............................................. B60T 8/60
[52] U.S. Cl. ..................................... 303/106; 303/100; 303/DIG. 4
[58] Field of Search ............... 303/100, 104, 105, 106, 303/110, DIG. 3, DIG. 4; 188/181 A, 181 C, 181 R

[56] References Cited

U.S. PATENT DOCUMENTS

| | | | |
|---|---|---|---|
| 3,433,536 | 3/1969 | Skinner | 303/DIG. 4 |
| 3,663,069 | 5/1972 | Perry et al. | 303/DIG. 4 |
| 3,674,318 | 7/1972 | Hickner et al. | 303/DIG. 4 |
| 3,762,775 | 10/1973 | Ochiai | 303/DIG. 4 |
| 3,966,264 | 6/1976 | Mattori et al. | 303/100 |
| 4,005,910 | 2/1977 | Leiber et al. | 303/106 |
| 4,033,634 | 7/1977 | Arai et al. | 303/110 |
| 4,054,328 | 10/1977 | Leiber et al. | 303/106 |
| 4,392,202 | 7/1983 | Matsuda | 303/DIG. 4 |
| 4,517,647 | 5/1985 | Harada et al. | 303/108 |

FOREIGN PATENT DOCUMENTS 2205787 8/1973 Fed. Rep. of Germany ...... 303/110
2528792 1/1976 Fed. Rep. of Germany .

Primary Examiner—Duane A. Reger
Assistant Examiner—Alvin Oberley
Attorney, Agent, or Firm—Frishauf, Holtz, Goodman & Woodward

[57] ABSTRACT

A wheel anti-blocking control system (ABS), in which, subsequent to a brake pressure drop, the first brake pressure rise pulse $\Delta P_2$ is controlled, in dependence on the preceding brake pressure drop ($\Delta P_1$) and on a quotient defined by the relationship:

$$\alpha \cdot \frac{|+\dot{\omega}_m|}{|-\dot{\omega}_m| + |+\dot{\omega}_m|}$$

in which $+\dot{\omega}_m$ and $-\dot{\omega}_m$ are representative of maximum angular acceleration/deceleration of the respective wheel being controlled and $\alpha$ is a factor somewhat less than unity, and which may vary in dependence on the direction of movement of the vehicle, for example whether the vehicle is moving in a straight path or is moving along a curve. If moving along a curve, so that angular acceleration is involved, the factor $\alpha$ is reduced.

11 Claims, 5 Drawing Figures

VEHICULAR ANTI-BRAKE LOCK SYSTEM AND METHOD OF CONTROLLING BRAKING PRESSURE

The present invention relates to a method to prevent blocking of vehicular brakes and to an anti-brake lock system.

BACKGROUND

Anti-Brake lock systems for vehicles customarily include sensors which sense the course of wheel speed during operation of the vehicle. An evaluation circuit is coupled to receive the signals from the wheel speed sensors to generate brake pressure control signals to control hydraulic or pneumatic pressure (or vacuum). The vehicle brakes or, rather, valves controlling admission of brake fluid to the brakes, are controlled by the signals from the evaluation circuit. The braking pressure at the respective wheel brakes is varied, permitting, for example, increase in braking pressure if the brake to be effective, drop in braking pressure if wheel slip or skidding is sensed, or an impending slip or skid is sensed. The braking pressure may also be maintained constant, for example by closing both a pressure inlet as well as a pressure outlet valve. Selectively opening the inlet and outlet valves, respectively, increases and lowers braking pressure.

The evaluation circuit, after an initial increase in braking pressure, may sense that the braked wheel has a tendency to skid and control the respective brake valve to lower the braking pressure. When the tendency to skid or the actual skid has terminated, as sensed, for example, by the wheel speed sensor and signal processing involving evaluation of the rate of change of wheel speed, or the rate of acceleration/deceleration of wheel speed, the braking pressure can be increased again. The level of increase of the braking pressure in a cycle, which may be denoted $\Delta p_2$, can be made dependent on the extent of prior drop in braking pressure, denoted $\Delta p_1$. Further braking pressure rise and pressure braking drop cycles may follow.

A vehicle anti-brake lock system (ABS) of the type described is shown in German Patent Publication Document DE-OS No. 24 60 904 (U.S. Pat. No. 4,054,328), particularly FIG. 2. As described, the first brake pressure rise following a brake pressure drop is made dependent on the pressure rise of one or more preceding control cycles. The very first control cycle, however, for which there is no preceding pressure rise, may be controlled, for example, by storing a prior brake pressure drop, and then consider such prior stored brake pressure drop as the factor on which a first brake pressure rise is considered.

THE INVENTION

It is an object of the invention to improve controlling of the level of the first pressure rise pulse after a pressure reduction. Briefly, the level of brake pressure increase, $\Delta p_2$, is controlled as a function of a quotient Q, in which the quotient Q includes functions representative of wheel deceleration and wheel acceleration. The wheel deceleration and acceleration, of course, is sensed by the sensor by signals transmitted to the evaluation circuit.

The system and method of the present invention, thus, considers, for the first brake pressure pulse, the extent of drop in brake pressure, the amount of angular deceleration $-\dot{\omega}$ as well as maximum angular wheel acceleration, $+\dot{\omega}$, both of which are included in the formation of the quotient Q.

The system and method has the advantage that the braking pressure drop can be accurately matched to the then pertaining road conditions and the then pertaining operating characteristics and conditions of the vehicle, as well as of the brakes thereof. The braking pressure can thus be accurately matched to the required pressure for maximum braking effort without causing instability.

In accordance with a preferred feature of the invention, the brake pressure increase is so controlled in combination with the pressure regulation that the brake pressure is measured and fed back to the level $\Delta p_2$. This system permits real-time control of braking pressure which is difficult to obtain otherwise due to the comparatively large number of parameters which, otherwise, would have to be considered in real time during any braking event.

The combination permits, after a constant pressure phase following a pressure drop, a pressure rise which reaches almost, but not quite, the braking pressure at which the wheel may block, that is, will skid. The pressure rise by the first pulse will be calculated in accordance with the following formula:

$$\Delta p_2 = \alpha \cdot \frac{|+\dot{\omega}_m|}{|-\dot{\omega}_m| + |+\dot{\omega}_m|} \cdot \Delta p_1, \tag{1}$$

wherein $\alpha$ is somewhat smaller than 1, for example 0.9. The factor $\alpha$ may be variable and depend, for example, upon the direction of the vehicle. For example, if the vehicle is operating in a curved path, the factor $\alpha$ may decrease, as sensed, for example, by a centrifugal sensor, deflection of the steering wheel or the like, and providing a "curved path" signal to provide the requisite factor which will result in stability, in view of the overall design of the vehicle and its operating characteristics when steered in a curved path.

Sensing, and considering the amount of maximum angular deceleration $-\dot{\omega}_m$ and the maximum acceleration, $+\dot{\omega}_m$, permits sensing the dynamics of the wheel, including the friction between the wheel and the road, that is, the frictional coefficient of the road as it affects the vehicle. Interferences and disturbances in the control path or control loop are likewise sensed, so that a pressure rise stage subsequent to a pressure drop stage can be optimally determined. Thus, the braking distance of the vehicle can be optimally determined, while maintaining high stability of the vehicle during this first control cycle.

Sensing the braking pressure can be used, further, to match the level of the first brake pressure rise, $\Delta p_2$, subsequent to a prior brake pressure rise and drop, such that, upon braking the vehicle when it operates in a curve, will cause a lower rate of brake pressure rise than otherwise, thereby guiding the wheel longer within a stable region of operation. This enhances overall stability of operation of the vehicle as well as the steering thereof. By differentiating transverse vehicle acceleration, that is, by sensing rate of change of transverse acceleration or deceleration, respectively, during braking, can be used to so control a pressure drop that the wheel will operate with high lateral stability and low braking slip, thus controlling a wheel for maximum braking effort while maintaining stability and steerability.

The system to carry out the method is particularly cost-effective since the transducers to provide wheel acceleration signals are already present anyway. If also pressure transducers or sensors are provided in the system they can be additionally employed. For example, in an electronic ABS, braking pressure can be electrically signalled. Braking systems may have distance sensors, which measure the deflection of a brake pedal or the pistons in the main brake cylinder. The deflection as sensed by a sensor can be used as pressure signal.

DRAWINGS

DETAILED DESCRIPTION

Figure 1:
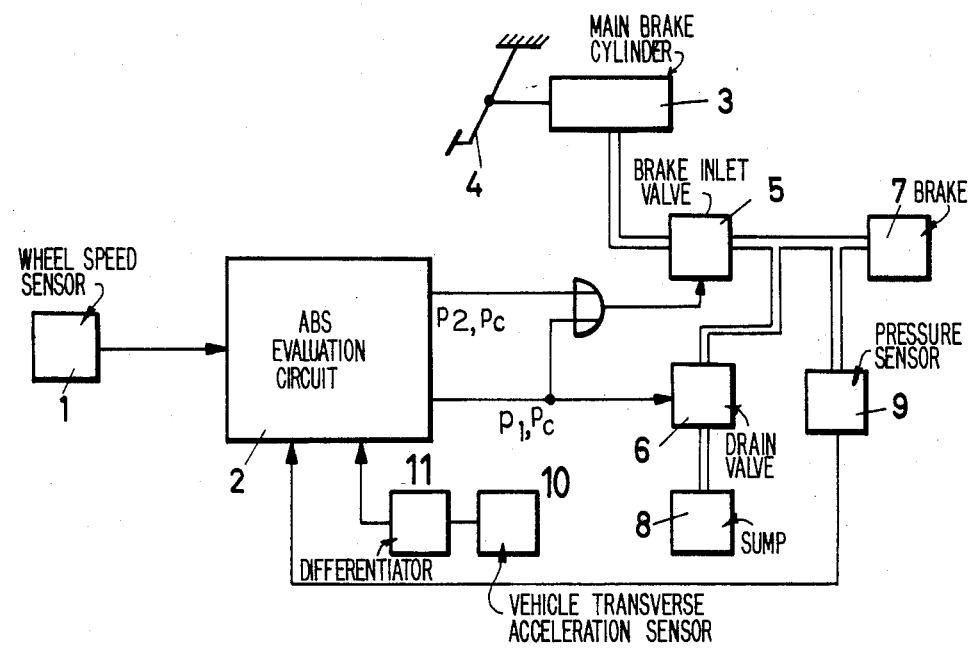
FIG. 1 is a schematic block diagram of the anti-brake lock system in accordance with the present invention.

A wheel speed transducer or sensor 1, associated with a vehicle wheel, provides a wheel speed signal to an evaluation circuit 2, of an anti-brake lock system. The circuit 2 provides brake pressure control signals for an inlet valve 5 and for an outlet or drain valve 6. The valves 5, 6 included in a brake pressure line between a main brake cylinder 3 and wheel brake 7. The main brake cylinder 3 is operated by an operator pedal 4. Unpressurized drained brake fluid is permitted to drain from the valve 6 to a sump 8, for recycling, as well known. A pressure sensor 9 senses braking pressure of pressurized brake fluid being applied to the brake 7. In the diagram, fluid lines are shown in double-line notation, and electrical control lines in single-line notation.

A transverse or curve acceleration sensor 10 senses whether the vehicle is operating on a straight or curved path. The output signal is applied to a differentiator 11 to obtain a signal representative of the rate of change of the transverse acceleration. The signal is applied to the circuit 2, as is the signal from the brake pressure sensor 9. if a decrease of the transverse acceleration is present the level of this decrease can be used to prolonge the pressure decrease signal accordingsly.

Figure 2:
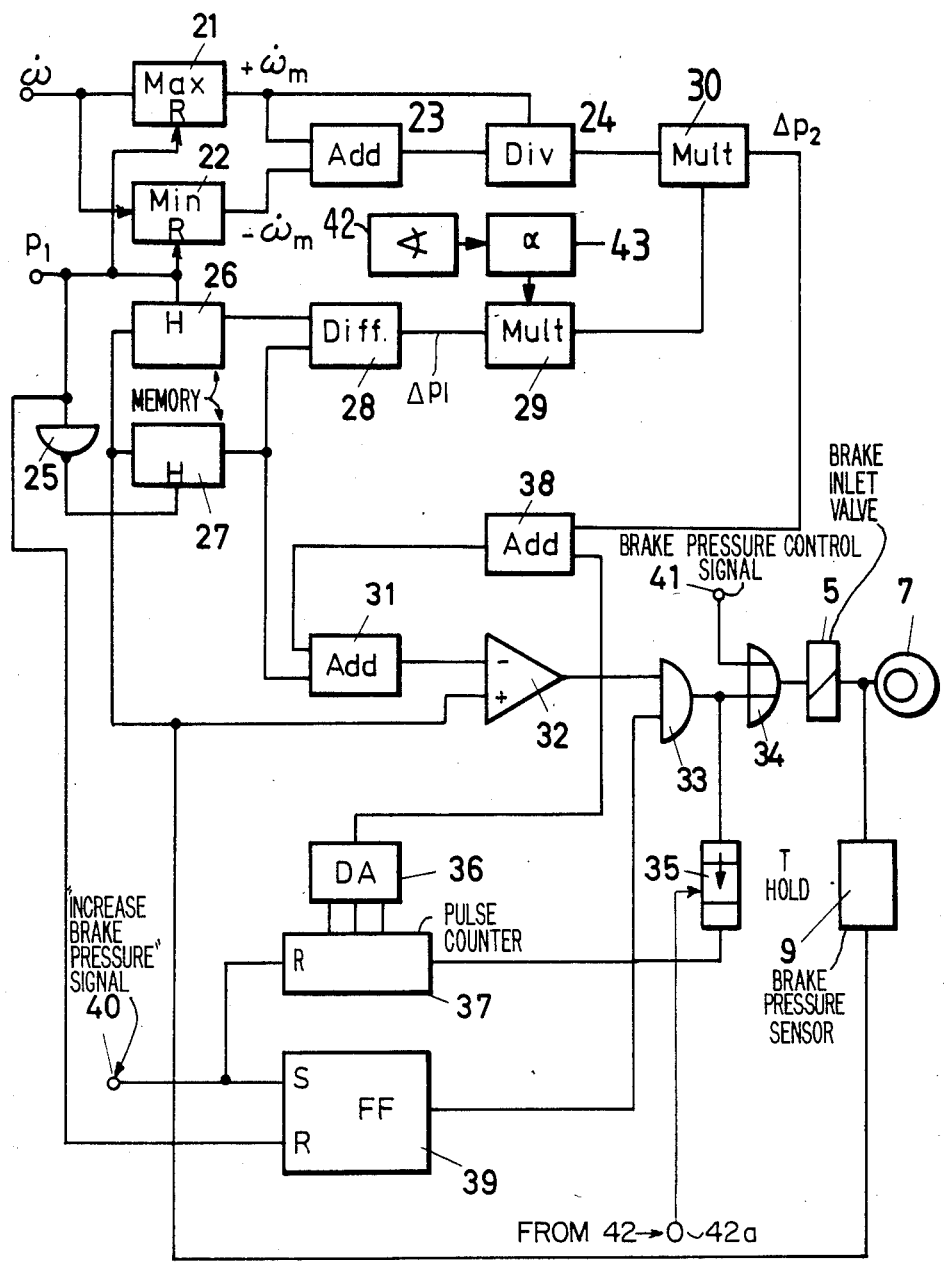
FIG. 2 is a block diagram illustrating a portion of the evaluation circuit.

Basic Operation: The evaluation circuit 2 generates output signals which are applied to the valves 5 and 6, as well known. Thus, the circuit 2 provides output signals $p_2, p_1, p_c$ to the valve 5 to increase brake pressure, ($p_2$), to the valve 6 to drop brake pressure, ($p_1$), and to both valves 5 and 6 to maintain the pressure constant, $p_c$. The brake pressure rise signal $p_2$ is the command for the begin of the period or portion of the cycle which increases braking pressure to the brake 7. The manner in which, in this period of time, brake pressure is increased, is determined by a circuit within the evaluation circuit 2. This particular circuit is shown in FIG. 2. The evaluation circuit includes a differentiator—not specifically shown—which differentiates the speed signal to provide a wheel speed rate-of-change signal $\dot{\omega}$, thus forming an acceleration/deceleration signal. For simplicity, in the discussion that follows, the term rate-of-change of wheel speed signal is intended to refer to the first derivative, with respect to time, of wheel speed, and hence, depending on the sign, wheel acceleration or deceleration.

FIG. 2 illustrates, in detail, the logic circuit to control rise or increase in brake pressure.

The wheel angular acceleration signal $\dot{\omega}$ is connected to two limit circuits 21, 22. Limit circuit 21 forms a maximum or peak detector circuit, and limit circuit 22 a minimum or low value detection circuit. Circuits 21, 22 thus determine the extremes of angular wheel acceleration $+\dot{\omega}_m$ and $-\dot{\omega}_m$.

An adder 23 receives the maximum and minimum angular wheel acceleration signals, that is, adds the values determined by blocks 21, 22. The output of the adder is connected to a divider in which the maximum value $\omega_m$ is divided by the sum, to form the quotient $$= \frac{|+\dot{\omega}_m|}{|+\dot{\omega}_m| + |-\dot{\omega}_m|} \quad (2)$$

wherein
$\dot{\omega}$ represents angular change in wheel speed;
$+\dot{\omega}$ is acceleration;
$-\dot{\omega}$ is deceleration and;
$\dot{\omega}_m$ is a maximum, absolute value Two memory circuits 26, 27 are connected to sense the braking pressure p as sensed by the brake pressure sensor 9. The memory 26 holds, or stores (notation H) the braking pressure at the beginning of drop in braking pressure; memory 27 holds, or stores (H) the braking pressure at the end or termination of drop in braking pressure by receiving a signal representative of drop in braking pressure through the inverter 25. The beginning-of-drop brake pressure signal, that is, beginning of signal $p_1$, is also used to control resetting of the maximum and minimum circuits 21, 22, that is, by connecting the respective signals to the reset terminals R of the maximum and minimum circuits 21, 22.

The difference between braking pressure at the beginning and at the end of pressure reduction is subtracted in a subtraction circuit or difference forming circuit 28, to thereby derive the change in braking pressure during the drop in braking pressure $\Delta P_1$. The output of the subtraction circuit 28 is applied to a multiplier 29 which receives the factor $\alpha = 0.9$ from the circuit 43 or, if a curved path is sensed, a smaller value as determined by a transverse acceleration sensor 42 which, for example, may be the identical with the sensor 10 (FIG. 1).

The block 42 provides this factor $\alpha$ to decrease the factor when the vehicle operates in a curve. A further multiplier 30, connected to the output of multiplier 29, multiplies the output from the divider 24 with the output derived from the multiplier 29. The output of the multiplier 30, thus, will then have the value expressed in equation (1) above, in which $\alpha$ is somewhat smaller than 1, for example 0.9, or a lesser value in dependence on the direction of the path of the vehicle.

The output from the multiplier 30 is connected through an adder 30—the function of which will be discussed below—to a further adder 31. The adder 31 receives as second input the wheel brake level signal representative of brake pressure after there was a pressure drop, so that the low pressure signal from the memory 27 is added to the calculated pressure rise value as determined by the equation (1). As soon as the actual brake pressure level, as sensed by the pressure sensor 9, exceeds the calculated brake pressure determined in adder 31, comparator 32 provides a logic-1 output which is applied via an AND-gate 33 and an OR-gate 34 to the inlet valve 5 to close the inlet valve 5 and thus stop further rise in braking pressure. The AND-gate 33 can be enabled only if a flip-flop (FF) 39 has been SET by the signal "increase pressure" at terminal 40. The FF 39 is RESET by the signal "p₁".

The brake pressure rise is controlled in small brake pressure rise steps which follow the calculated brake pressure rise pulse $\Delta p_2$.

The small steps are generated by a pulse generator formed by a pulse counter 37 which is controlled by a timing circuit 35, a digital-analog converter 36 and an adder 38. Timing circuit 35 controls the respective holding phase between the pulses. The counted amount is applied through a digital/analog converter 36 to the adder 38. Via the elements 31, 32, 33 and an OR-gate 34 control valve 5 is controlled to operate in pulsed manner. The signals derived from the D/A converter 36 may have different levels, these signals controlling the level of the further pressure build-up or pressure increase pulses $\Delta p$. For example: When the first pulse ends because the measured pressure reaches the level of the calculated pressure, the signal blocking valve 5 is present and delayed by timing circuit 35 for the holding time. Thereafter the output signal of the timing circuit 35 is counted as one pulse in counter 37 and an corresponding analog signal is transmitted to adder 38, which thereby increases the calculated pressure level. Increasing of this level $\Delta p_2$ finishs the output of comparator 32 and pressure is increased until the measured pressure reaches the new level etc.

The braking pressure in the wheel brake 7 is measured by the brake pressure sensor 9. The brake pressure level measurement can also be generated differently, for example in a main cylinder arrangement, in twin cylinder construction, by sensing the deflection path of main cylinder, if the piston position in the main cylinder is controlled by the ABS. This is a particularly desirable and economically effective sensing arrangement. Terminal 41 provides a signal for the inlet valve if the brake pressure is to be dropped, or the brake pressure is to be maintained constant, that is, that valve 5 should remain closed during operating phases when the drain valve 6 (FIG. 1) also should be closed—constant braking pressure—or may open—drop in braking pressure.

The transverse acceleration sensor 10, the output of which is differentiated in differentiating circuit or stage 11, is applied to the evaluation circuit 2, the thus generated and applied signal extending the duration during which pressure is dropped or decreased if the transverse acceleration decreased.

DETAILED OPERATION, WITH REFERENCE TO FIGS. 3-5

Figure 3:
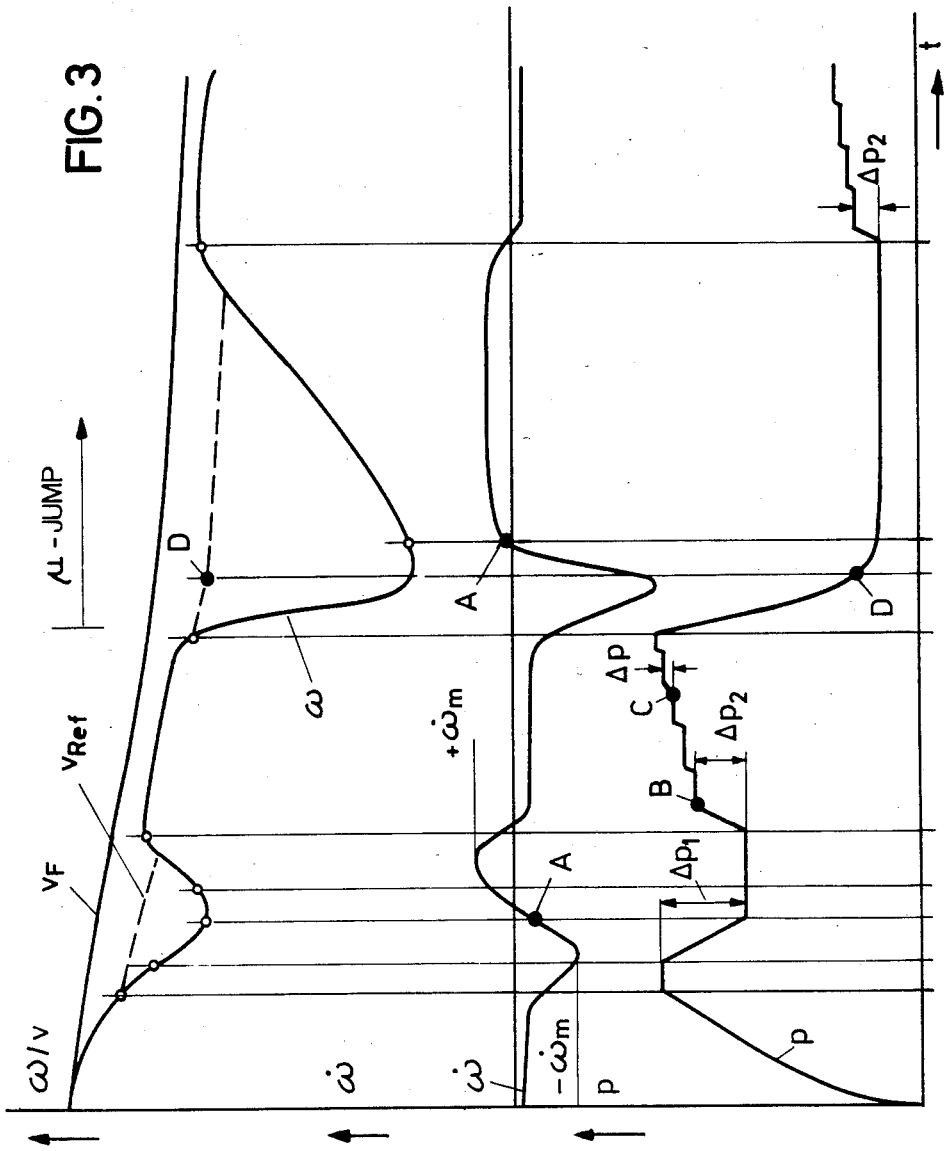
FIG. 3 is a series of curves, with respect to time, to illustrate the operation.

FIG. 3, top graph, illustrates the course of vehicle speed $v_F$, reference speed $v_{Ref}$ to determine slip, as well as angular wheel speed $\omega$ for an assumed course of a braking event with anti-brake lock control. A sharp discontinuity in frictional adhesion of a wheel, that is, a jump in wheelroad friction or $\mu$ jump is also illustrated.

The center graph illustrates the course of acceleration $\dot{\omega}$ of the wheel, and, further, extreme values $-\dot{\omega}_m$ and $+\dot{\omega}_m$ for the first control cycle are likewise shown. The bottom diagram illustrates the course of brake pressure and the measured pressure drop level $\Delta p_1$, and the determined pressure rise level $\Delta p_2$ for the first pressure rise following a pressure drop, as well as the change in pressure $\Delta p$ by further pulses.

The respective points on the curves designated A . . . D correspond to the equivalent events shown by points A . . . D in FIGS. 4 and 5, in which the braking torque $M_{BR}$ and the road friction torque $M_R$ is shown in the ordinate of FIG. 4 or 5.

Figure 4:
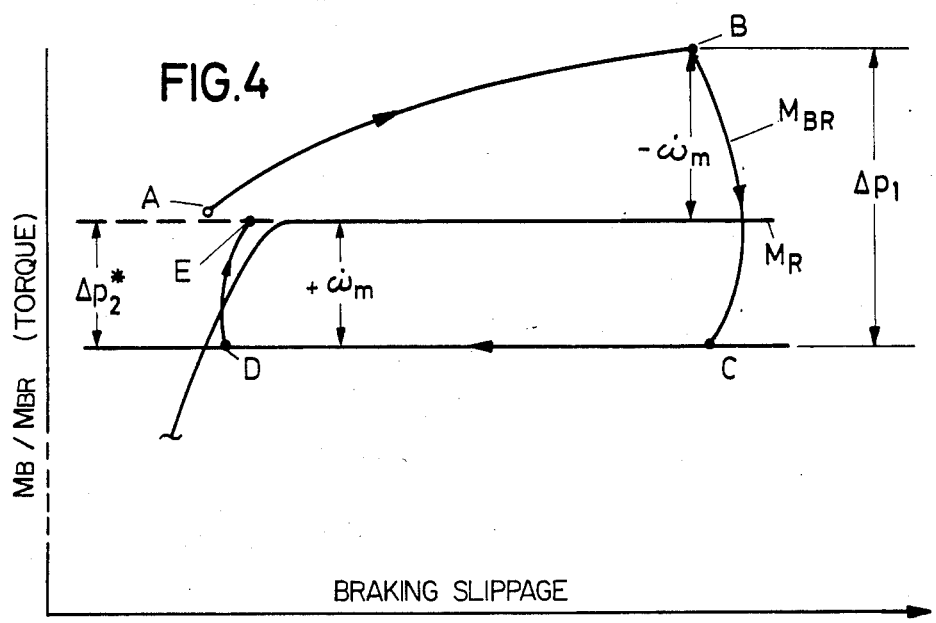
FIG. 4 is a curve of braking effort or torque (ordinate) with respect to braking slippage (abscissa)

The general principle of rise in brake pressure dependent on the brake pressure drop phase $\Delta p_1$ and maximum wheel angular change in speed $+\dot{\omega}_m$ and $-\dot{\omega}_m$ is best seen in FIG. 4. The road friction torque is determined by $$M_R = \mu_B N \cdot r,$$

wherein $\mu_B$ is the frictional coefficient between wheel and road surface, N the engagement force of the wheel on the road, and r the dynamic rolling radius of the wheel. The braking effort, in torque, $M_{BR}$ is approximately proportional to the braking pressure.

Figure 5:
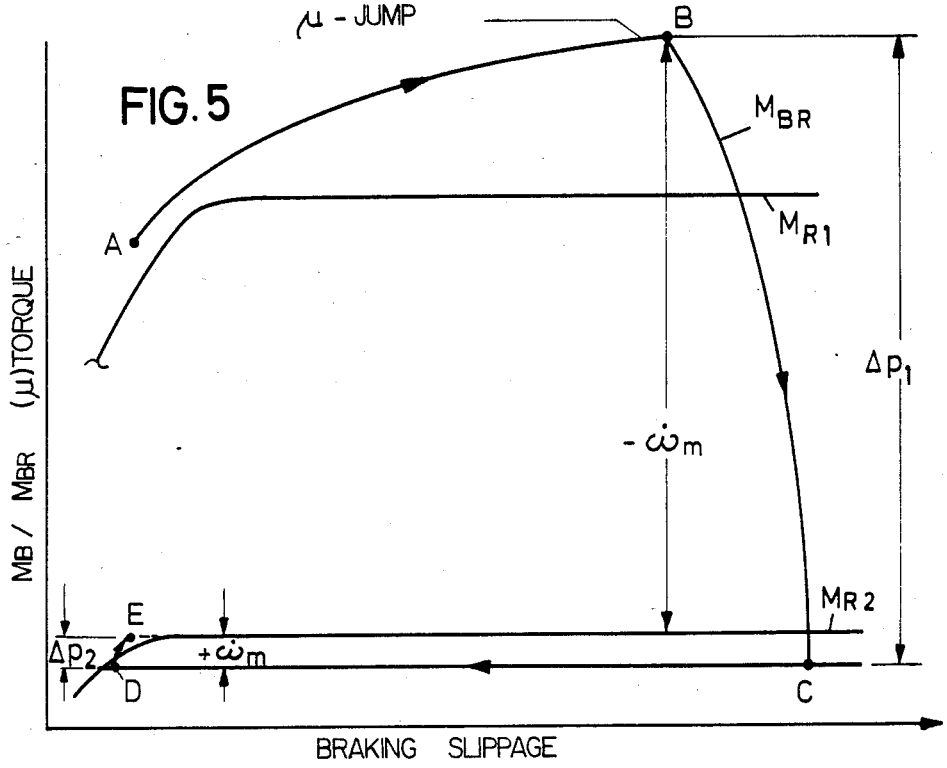
FIG. 5 is a diagram of road adhesion or friction of the wheel on the road, in terms of torque (ordinate) with respect to braking slippage (abscissa).

Upon operating the brake, the braking torque $M_{BR}$ first increases in accordance with the portion of the curve from A to B (see FIGS. 4 and 5). The braking slippage increases. At point B, braking pressure is dropped. The drop is shown by the level $\Delta p_1$, along the curve portion B-C. Maximum angular wheel deceleration $-\dot{\omega}_m$ occurs between the brake torque at point B and the road friction torque $M_R$. The course of the curve between points C and D is a constant brake pressure phase. Maximum angular acceleration $+\dot{\omega}_m$ occurs between point D and frictional torque $M_R$. Pressure is then increased to reach the pressure at point E.

FIGS. 4 and 5 readily demonstrate the relationship $$\frac{\Delta p_2^*}{\Delta p_1} = \frac{|+\dot{\omega}_m|}{|-\dot{\omega}_m| + |+\dot{\omega}_m|}. \tag{3}$$

If, instead of $\Delta p_2^*$ for increase in braking pressure, the relationship $$\Delta p_2 = \alpha \cdot \Delta p_2^* \tag{4}$$

is used, in which $\alpha$ is selected to be smaller than 1, for example 0.9, or changed in dependence on direction of the path of the vehicle, then the previously discussed relationship (1) is obtained.

FIG. 5 illustrates how the pressure increase is optimally matched to the operating conditions of the vehicle, even if the frictional coefficient of wheel adhesion to the road changes suddenly or, as shown, by a sudden drop in friction, as shown by the $\mu$ jump. Just before the point C is reached, the change in road adhesion from $M_{R1}$ to $M_{R2}$ occurs. FIG. 5 illustrates that the pressure increase phase $\Delta p_2$ is optimally matched even under those conditions. The relationship (1) shows that this is, under such conditions, due to the large value of the factor $-\dot{\omega}_m$ which, then, will result in a comparatively small pressure rise phase $\Delta p_2$.

We claim:
1. In a vehicle having an anti-brake lock system, a method of controlling braking, wherein the vehicle has means (1) for generating signals representative of the rotary behaviour of the vehicle wheels and providing wheel speed ($\omega$), wheel acceleration ($+\omega$) and wheel deceleration ($-\omega$) signals;
   an evaluation stage (2) receiving the said signals and providing brake control signals;
   wheel brake means (7) responsive to the wheel brake control signals to apply braking pressure to the wheel brakes, said evaluation stage controlling after a braking pressure reduction (FIG. 4: B-C), the following first brake pressure increase pulse ($\Delta p_2$), wherein the level of the brake pressure increase pulse is dependent on the level of a preceding brake pressure decrease ($\Delta p_1$) said pulse being, followed by further brake pressure increase pulses of small pressure level, and comprising, the step of controlling the level of the brake pressure increase pulse ($\Delta p_2$) additionally as a function of a quotient (Q), in which the quotient (Q), is defined by dividing a signal representative of maximum wheel acceleration ($+\dot{\omega}_m$) by the sum of signals representative of maximum wheel acceleration ($+\dot{\omega}_m$) and maximum wheel deceleration ($-\dot{\omega}_m$), $$\left( Q = \frac{|+\dot{\omega}_m|}{|-\dot{\omega}_m| + |+\dot{\omega}_m|} \right)$$

wherein $\omega$ is representative of the wheel speed $\dot{\omega}$ is representative of the change of wheel speed; and $\dot{\omega}_m$ is the maximum change of wheel speed.

2. Method according to claim 1, including the step of introducing a factor $\alpha$ close to, but less than one to the quotient (Q).

3. Method according to claim 2, including the step of sensing if the vehicle is operating in a curved path;
and changing the factor $\alpha$ in a direction to reducing the factor of $\alpha$ if the vehicle is operating in the curved path.

4. Method according to claim 3, wherein the step of sensing the operation of the vehicle in the curved path is done by sensing transverse acceleration of the vehicle.

5. Method according to claim 1, including the step of controlling the level of preceding pressure decrease ($\Delta p_1$) additional as a function of decrease in transverse acceleration in a direction of increasing the duration of the pressure decrease as a function of decrease in the transverse acceleration to thereby decrease wheel slippage.

6. Method according to claim 1, including the step of calculating the brake pressure increase pulse;
measuring applied brake pressure; and
comparing calculated first brake pressure increase pulse with measured brake pressure and controlling the actually applied brake pressure as a function of the applied brake pressure and the calculated brake pressure.

7. Brake signal control system for a vehicle having an anti-brake lock system,
wherein the vehicle has means (1) for generating signals representative of the rotary behaviour of the vehicle wheels and providing corresponding signals;
an evaluation stage (2) receiving the said signals and providing brake control signals;
wheel brake means (7) responsive to the wheel brake control signals to apply braking pressure to the wheel brakes,
said evaluation stage controlling, after a braking pressure reduction (FIG. 4: B-C) the following first brake pressure increase pulse ($\Delta p_2$), wherein the level of the brake pressure increase pulse is dependent on the level of a preceding brake pressure decrease ($\Delta p_1$), said pulse being followed by further pulses of small pressure level and comprising, means (23, 24, 30, 32) for controlling the level of the brake pressure increase pulse ($\Delta p_2$) additionally as a function of a quotient (Q), in which the quotient (Q) includes factors representative of wheel deceleration ($-\dot{\omega}$) and wheel acceleration ($+\dot{\omega}$), as sensed by said signal generating means (1), wherein the means for controlling the level of the first brake pressure increase pulse comprises
means for deriving the quotient including means for determining maximum angular wheel acceleration ($+\dot{\omega}_m$) and obtaining a representative maximum wheel acceleration signal,
means for determining maximum angular wheel deceleration ($-\omega_m$) and obtaining a representative maximum wheel deceleration signal;
adder means (23) receiving said maximum wheel acceleration and deceleration signals and providing a sum, or added amount signal; and
divider means (24) connected to divide the maximum wheel acceleration signal by the sum, or added amount, signal to obtain an output signal in accordance with the relationship "one";

$$Q = \frac{|+\dot{\omega}_m|}{|-\dot{\omega}_m| + |+\dot{\omega}_m|}$$

8. System according to claim 7 further including means for controlling the level ($\Delta p_2$) of the pressure increase pulse as a function of a preceding brake pressure decrease, said controlling means including memory means (26, 27), storing pressure decrease signals, and difference forming means (28) providing a respective difference output signal ($\Delta p_1$)
and multiplier means (30) multiplying the difference output signal with the signal determined by the relationship "one" as defined in claim 7.

9. System according to claim 8, further including means (43) for generating a modifying factor ($\alpha$), and multiplying means (29) for multiplying the modifying factor with a signal controlling the level of the brake pressure increase pulse as derived from said pressure increase pulse level control means (23, 24, 30, 32), said factor being close to but less than one.

10. System according to claim 9, further including means (10, 11) for obtaining a "curved path" signal representative of operation of the vehicle in a curved path;
and wherein said modifying factor generating means (43) is connected to and controlled by the vehicle curved path signal in a direction to decrease the level of the first brake pressure increase pulse as controlled by said brake pressure increase level control means (23, 24, 30, 32) upon detection of said "curved path" signal.

11. System according to claim 7, further including brake pressure sensing means (9) coupled to receive a signal representative of brake pressure being applied to the vehicle brake (7) and generating a brake pressure signal;
and a control loop (32, 33, 34) responsive to the brake pressure signal and controlling the applied brake pressure as a function of measured brake pressure and brake pressure as calculated based on said quotient.

* * * * *